United States Patent
Garg et al.

(10) Patent No.: US 12,530,385 B2
(45) Date of Patent: Jan. 20, 2026

(54) PROVIDING TROUBLESHOOTING SOLUTIONS

(71) Applicant: Hewlett-Packard Development Company, L.P., Spring, TX (US)

(72) Inventors: Ayush Garg, Bangalore (IN); Himanshu Tiwari, Bangalore (IN); Shameed Sait M A, Bangalore (IN); Niranjan Damera Venkata, Chennai (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 569 days.

(21) Appl. No.: 17/794,116

(22) PCT Filed: Feb. 14, 2020

(86) PCT No.: PCT/US2020/018268
§ 371 (c)(1),
(2) Date: Jul. 20, 2022

(87) PCT Pub. No.: WO2021/162703
PCT Pub. Date: Aug. 19, 2021

(65) Prior Publication Data
US 2023/0068230 A1    Mar. 2, 2023

(51) Int. Cl.
*G06F 16/338* (2019.01)
*G06F 16/334* (2025.01)
*G06F 40/40* (2020.01)

(52) U.S. Cl.
CPC ........ *G06F 16/338* (2019.01); *G06F 16/3347* (2019.01); *G06F 40/40* (2020.01)

(58) Field of Classification Search
CPC .... G06F 16/338; G06F 16/3347; G06F 16/33; G06F 40/20; G06F 40/40; G06F 16/245; G06F 40/30; G06N 20/10
See application file for complete search history.

(56) References Cited

U.S. PATENT DOCUMENTS

| | | |
|---|---|---|
| 6,170,065 B1 * | 1/2001 | Kobata ............... G06F 11/0748 714/38.14 |
| 6,535,865 B1 | 3/2003 | Skaanning et al. |
| 7,385,716 B1 | 6/2008 | Skaanning |
| 9,092,802 B1 | 7/2015 | Akella |
| 10,397,043 B2 | 8/2019 | Tapia et al. |
| 2003/0050908 A1 | 3/2003 | Kreulen et al. |

(Continued)

*Primary Examiner* — Huyen X Vo
(74) *Attorney, Agent, or Firm* — Quarles & Brady LLP

(57) ABSTRACT

System for providing troubleshooting solutions for an electronic device is described. The system includes a query engine, that may receive a troubleshoot query from a user of the electronic device. The troubleshoot query indicates a device model of the electronic device and an issue with the electronic device. Further, the query engine may identify a context vector corresponding to the device model based on a mapping table and the device model. The context vector describes a relationship between the device model, a plurality of troubleshoot support documents, and functional features of the device model. Further, the system includes a machine learning engine to determine a troubleshooting solution for the issue based on the issue and the context vector corresponding to the device.

20 Claims, 6 Drawing Sheets

(56) References Cited

U.S. PATENT DOCUMENTS

| | | | |
|---|---|---|---|
| 2014/0310222 A1* | 10/2014 | Davlos | G06F 11/2294 706/46 |
| 2017/0011308 A1 | 1/2017 | Sun et al. | |
| 2017/0255876 A1 | 9/2017 | Malatesha et al. | |
| 2019/0306327 A1 | 10/2019 | Matysiak et al. | |

* cited by examiner

PROVIDING TROUBLESHOOTING SOLUTIONS

BACKGROUND

Support systems may be established and managed by manufacturers in order to assist a user in resolving an issue related to functioning of an electronic device. Electronic devices, such as imaging device, computing device, network peripherals, audio and video device, and other electronic or mechanical goods, are peripherals commonly used in home and office environments for carrying out a wide range of processes. Each electronic device may have certain functionalities to carry out the wide range of processes. For example, imaging devices may support multiple functions, such as printing, scanning of a document, photocopying of a document, and fax or email of a scanned document. Similarly, network peripherals may support different functionalities, such as routing and repeating messages. Further, multiple models of electronic devices, having different combinations of the functions, may be manufactured to cater to a wide customer base having varying uses and monetary considerations.

BRIEF DESCRIPTION OF DRAWINGS

The detailed description is described with reference to the accompanying figures. It should be noted that the description and figures are merely examples of the present subject matter and are not meant to represent the subject matter itself.

Figure 1:
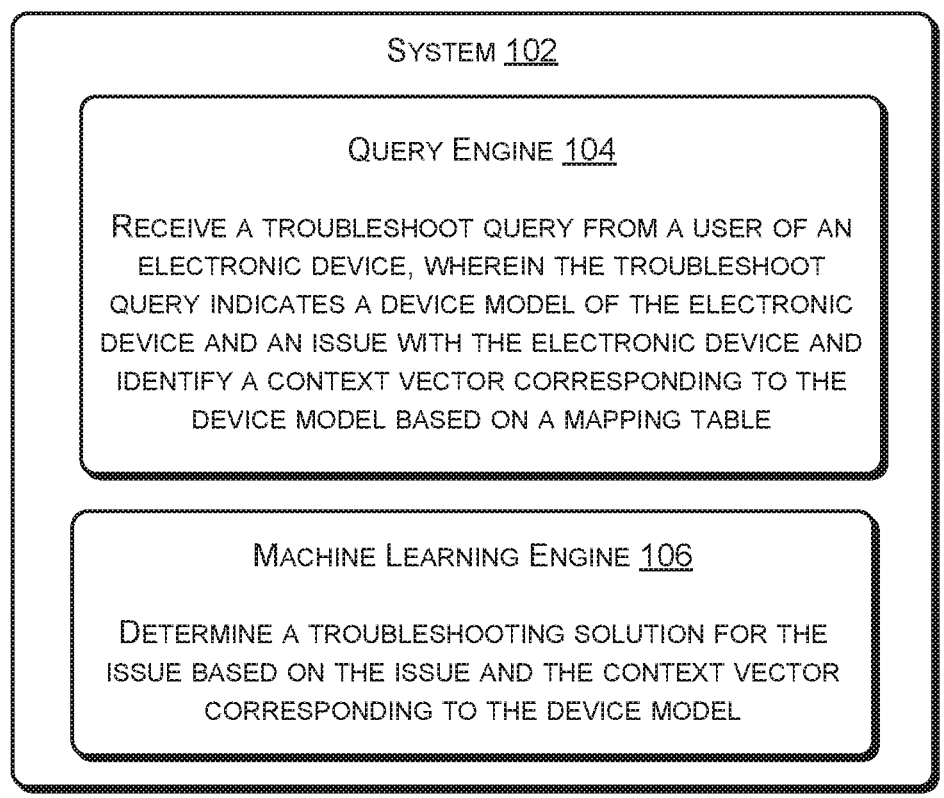
FIG. 1 illustrates a system for providing troubleshooting solutions, according to an example implementation of the present subject matter.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

To assist a user in resolving issues related to functioning of an electronic device, such as an imaging device, a computing device, network peripherals, and other electronic or mechanical goods, support systems may be established and managed by manufacturers.

In order to troubleshoot an electronic device, support systems typically provide a separate troubleshoot support manual for each device model to provide troubleshooting solutions for multiple issues that may occur during operation of an electronic device of the particular device model. In one example, a troubleshoot support manual may include troubleshoot support documents that may provide steps that a user may follow to overcome an issue related to an electronic device of the particular device model. In one example, the troubleshoot support manual may include a plurality of pages having the troubleshoot support documents for various device models. In one example, a troubleshoot support document may refer to a page, one or more pages, logs, records, and parts or sections of a page. For instance, a single page of the troubleshoot support manual may include a troubleshoot support document that may provide troubleshooting steps to overcome an issue. In another example, a troubleshoot support document may span multiple pages of the troubleshoot support manual that may provide troubleshooting steps for an issue.

In one example, a troubleshoot support document for an imaging device may provide steps for resolving issues, such as paper jam, multiple sheets drawn at same time, color mismatch, incomplete print. In another example, a troubleshoot document for a network peripheral may provide steps for resolving issues, such as mismatched wireless security settings, MAC address restrictions, overheating or overloading, loose or disconnected cables, and outdated firmware. However, creating dedicated manuals for each device model is a very tedious and time-consuming task. Each time a new electronic device is introduced by the manufacturer, a new support manual may have to be generated for the new electronic device.

In one technique, machine learning models are used for providing troubleshooting solutions to a user of the electronic device. The machine learning models are trained by feeding troubleshoot support documents corresponding to each device model. However, such techniques are not scalable for a large number of device models as the amount of data that is to be fed to the machine learning model increases with the increase in number of device models. Further, each time a new device model is introduced by a manufacturer, the machine learning model has to be retrained for the new device model.

The present subject matter relates to a system for providing troubleshooting solutions to assist a user of an electronic device in resolving an issue related to the electronic device. In one example implementation of the present subject matter, the system uses a machine learning model to identify a solution for an issue, such as paper jam or network connectivity faced by a user of the electronic device. The machine learning model may determine a troubleshooting solution for the issue based on the issue and a context vector corresponding to the device. In one example, to provide a solution, the machine learning model may identify a troubleshoot support document using the issue, features of the electronic device, and the context vector corresponding to a device model of the electronic device. In one example, the context vector describes a relationship between the device model, a plurality of troubleshoot support documents, and functional features of the device model. In another example, the machine learning model may analyze a plurality of case logs corresponding to the issue to identify the troubleshooting solution previously provided to a user for the same issue and the similar device model.

In one example implementation of the present subject matter, to train the machine learning model, the system may analyze the plurality of troubleshoot support documents to generate a support vector for each of a plurality of device models. The support vector for a device model may indicate a relationship between the device model and each of the plurality of troubleshoot support documents. In one example, the relationship may indicate either presence or absence of a reference of the device model on troubleshoot support documents. Further, the system may analyze the plurality of troubleshoot support documents to obtain a device feature vector for each device model. The device feature vector for a device model may indicate functional features of the device model. The system may subsequently generate a context vector for each device model based on the support vector and the device feature vector corresponding to the device model. The system may provide the context vectors to a machine learning engine running the machine learning model to train the machine learning engine. The machine learning engine may thus be trained to determine a troubleshooting solution for issues relating to the device models from the plurality of troubleshoot support documents using the context vectors.

Further, when a new device model is developed, the machine learning engine may be provided with a new context vector corresponding to the new device model. As the new context vector may have features similar to previously generated context vectors, the machine learning engine may start processing issues for the new device model without going through a training phase for the new device model.

In operation, when the system is running in a prediction phase, the system may receive a troubleshoot query from the user of the electronic device. The troubleshoot query may indicate the device model of the electronic device and the issue with the electronic device. The system may identify the context vector corresponding to the device model based on a mapping table and the device model. The mapping table may include a mapping between the device model and the context vector.

Subsequently, the machine learning engine of the system may determine a troubleshooting solution based on the issue and the context vector and provide the troubleshooting solution to the user.

The present subject matter thus provides an efficient and easy way of providing troubleshooting solutions. Generating a context vector for each device model allows the machine learning engine to be trained based on the functional features and existing troubleshoot support documents of the device model. As a result, the troubleshooting solutions may be provided based on the functional features of the device model and may be common for a large number of device models. The machine learning model may thus be trained with less amount of data in comparison to techniques where the machine learning model may be separately trained for each device model, irrespective of the presence of common features across multiple models.

For example, out of 100 device models, a first set of device models may include scanning and printing functionality and a second set of device models may include printing and fax functionality. Therefore, troubleshoot support documents for issues related to scanning may be common for the first set of device models. The troubleshoot support documents for issues related to fax functionality may be common for the second set of device models. The troubleshoot support documents for issues related to printing functionality may be common for all the device models. Thus, less amount of raw data, such as troubleshoot support documents, may be provided to the machine learning engine.

Further, computational power required to process the raw data may be reduced substantially when compared with the other approaches, thereby making the system less complex and resource optimized.

Further, since the machine learning engine is trained based on the functional features of the electronic device, the machine learning model may not have to be trained each time a new device model is launched. Thus, a new device model may be added for customer support by providing a new context vector of the new electronic device. For example, if the new electronic device has six functional features for which the machine learning model has already been trained, the system may be provided with the new context vector without performing any training for the new device model. Thus, the machine learning model may not have to be trained again for the existing functional features, making the data handling of the machine learning model efficient. Further, such approaches may allow a large number of electronic devices to be added to the system, thereby allowing easy scalability of the system The present subject matter is further described with reference to FIGS. 1 to 6. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a system 102, according to an example implementation of the present subject matter. In one example of the present subject matter, the system 102 may provide troubleshooting solution to a user of an electronic device (not shown in this figure). Examples of the system 102 may include, but are not limited to, desktop computers, laptops, tablets, portable computers, workstation, mainframe computer, servers and network servers. Examples of the electronic device may include, but are not limited to, imaging devices, computing devices, network peripherals, and other electronic or mechanical goods.

The system 102 may be implemented either as a stand-alone system or as a distributed computing system having one or more physical computing systems geographically distributed at same or different locations. In one example implementation, the system 102 may be implemented on the electronic device to provide troubleshooting solution to a user of the electronic device. In another example implementation, the system 102 may be implemented on a server, such as a support providing system (not shown in this figure) to provide troubleshooting solution a plurality of users at home or office environment. In one implementation, the system 102 may include a query engine 104 to receive a troubleshoot query from a user of the electronic device. In one example, the troubleshoot query may indicate a device model of the electronic device and an issue with the electronic device. In one example, the issue may indicate a problem that the user may encounter while operating the electronic device. For example, a user may experience several problems, such as paper jam, printer connectivity issue, printing blank pages while operating an imaging device. Similarly, the user may experience several problems, such as mismatched wireless security settings, MAC address restrictions, overheating or overloading, loose or disconnected cables, and outdated firmware while operating a network peripheral.

The query engine 104 may further identify a context vector corresponding to the device model based on a mapping table and the device model. In one example, the context vector may describe a relationship between the device model, a plurality of troubleshoot support documents, and functional features of the device model. In one example, a troubleshoot support manual may include troubleshoot support documents that may provide steps that a user may follow to overcome an issue related to an electronic device of the particular device model. In one example, the troubleshoot support manual may include a plurality of pages having the troubleshoot support documents for various device models. In one example, a troubleshoot support document may be a page, one or more pages, logs, records, and parts or sections of a page of a troubleshoot support manual. For instance, a single page of the troubleshoot support manual may include a troubleshoot support document that may provide troubleshooting steps to overcome an issue. In another example, a troubleshoot support document may span multiple pages of the troubleshoot support manual that may provide troubleshooting steps for an issue.

The functional features may represent behavioral objective associated with the particular electronic device. Examples of functional features of an imaging device may include, but are not limited to, scanning, faxing, printing, and copying. Similarly, functional features of a network peripheral may include routing and repeating messages.

The system 102 may further include a machine learning engine 106 to determine a troubleshooting solution for the issue based on the issue and the context vector corresponding to the device model. In one example, the machine learning engine 106 may be trained using a plurality of context vectors to predict the troubleshooting solution for a plurality of device models such that troubleshooting solutions may be provided for any electronic device having functional features already captured in the context vectors.

In one example, to determine the troubleshooting solution the machine learning engine 106 may identify a troubleshoot support document describing the troubleshooting solution for the issue based on the issue and the context vector. The machine learning engine 106 may identify the troubleshoot support document from among the plurality of troubleshoot support documents used to create the context vectors. In another example, the machine learning engine 106 may analyze a plurality of case logs corresponding to the issue to identify a troubleshooting solution previously provided to a user for the same issue and the similar device model. The machine learning engine 106 may subsequently provide the troubleshooting solution for the issue to the user.

Figure 2:
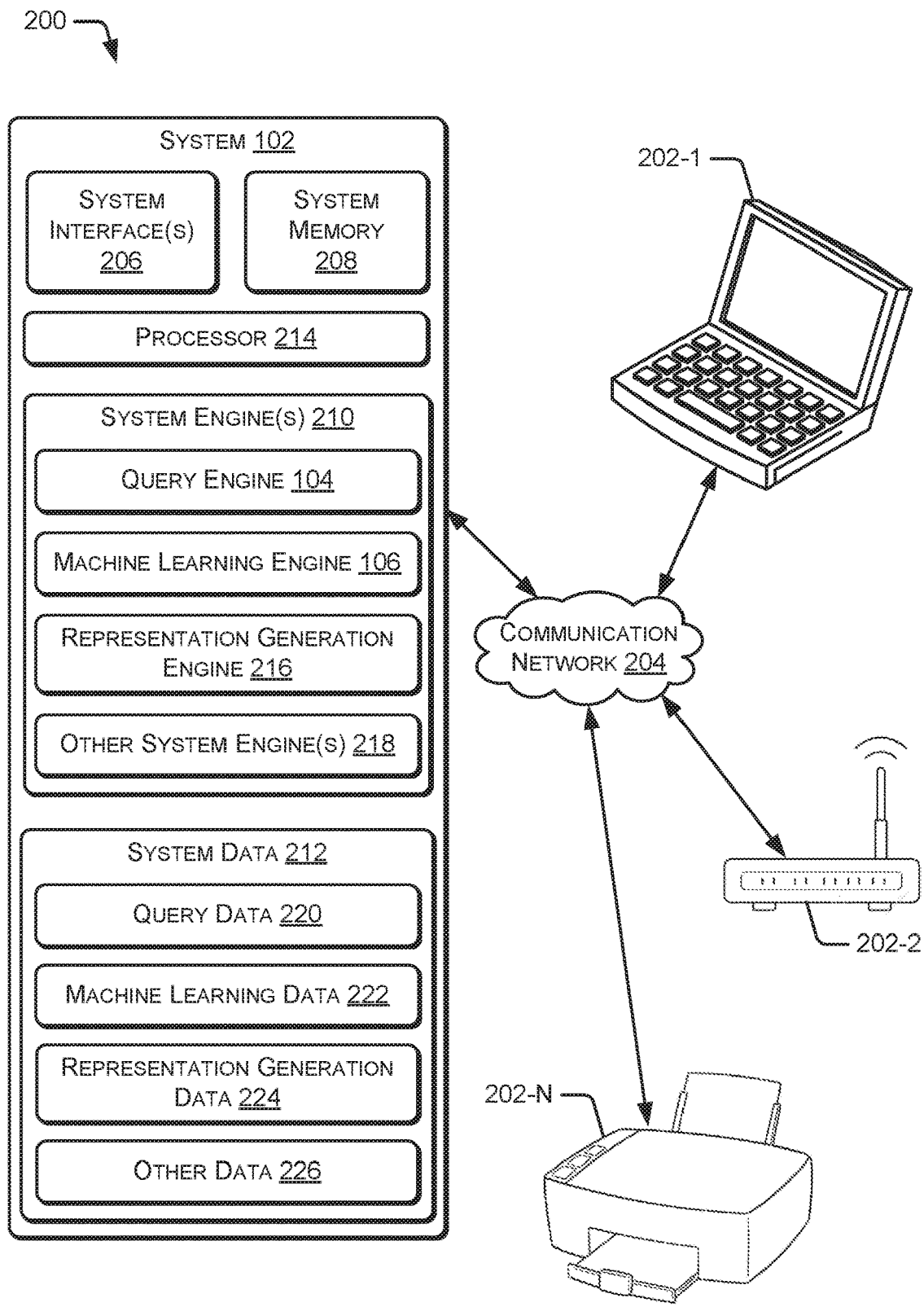
FIG. 2 illustrates a system for providing troubleshooting solutions, according to an example implementation of the present subject matter.

FIG. 2 illustrates a computing environment 200 implementing the system 102 for providing troubleshooting solutions to a plurality of electronic devices, according to an example implementation of the present subject matter. The computing environment 200 may include the system 102 and a plurality of electronic devices 202-1, 202-2, and 202-N. The electronic devices 202-1, 202-2, and 202-N may be individually referred to as an electronic device 202 and collectively referred to as electronic devices 202.

Examples of the electronic device 202 may include, but are not limited to, imaging devices, computing devices, network peripherals, and other electronic or mechanical goods. The user may use the electronic devices 202 for performing various tasks. For example, a user may use the electronic device 202-1 for storing, accessing, manipulating, calculating, analyzing data and information. Similarly, a user may use the electronic device 202-2 for carrying out a plurality of operations, such as printing, fax, scanning, and copying.

In one example implementation, the system 102 may be implemented as a distributed computing system having one or more physical computing systems geographically distributed at different or same geographical locations. Further, in an example implementation, the system 102 may be implemented on the electronic device 202. The present approaches may also be implemented in other types of system 102 and electronic device 202 without deviating from the scope of the present subject matter.

In one example implementation, the system 102 may be communicatively coupled to the electronic devices 202 over a communication network 204 to provide troubleshooting solutions to the electronic devices 202. The communication network 204 may be a wireless network, a wired network, or a combination thereof. The communication network 204 may also be an individual network or a collection of many such individual networks, interconnected with each other and functioning as a single large network, e.g., the Internet or an intranet. The communication network 204 can be one of the different types of networks, such as intranet, local area network (LAN), wide area network (WAN), and the internet. In an example, the communication network 204 may include any communication network that uses any of the commonly used protocols, for example, Hypertext Transfer Protocol (HTTP), and Transmission Control Protocol/Internet Protocol (TCP/IP).

The system 102 may include system interface(s) 206 and system memory 208. The system interface(s) 206 may include a variety of interfaces, for example, interfaces for data input and output devices, referred to as I/O (input/output) devices, storage devices, network devices, and the like. The system interface(s) 206 may facilitate communication between the system 102, the electronic device 202, and various other computing devices connected in the environment 200. The system interface(s) 206 may also provide a communication pathway for one or more components of the system 102. Examples of such components may include, but are not limited to, input device, such as keyboards and a touch enabled graphical user interface.

The system memory 208 may store one or more computer-readable instructions, which may be fetched and executed to provide print interfaces to users for providing print instructions. The system memory 208 may include any non-transitory computer-readable medium including, for example, volatile memory such as Random Access Memory (RAM), or non-volatile memory such as Erasable Programmable Read-only Memory (EPROM), flash memory, and the like. The system 102 further includes system engine(s) 210 and system data 212.

The system engine(s) 210 may be implemented as a combination of hardware and programming (for example, programmable instructions) to implement one or more functionalities of the system engine(s) 210. In examples described herein, such combinations of hardware and programming may be implemented in several different ways. For example, the programming for the system engine(s) 210 may include processor executable instructions stored on a non-transitory machine-readable storage medium and the hardware for the system engine(s) 210 may include a processing resource to execute such instructions. In one example, the system engine(s) 210 may further be coupled to processor(s) 214 of the system 102 to execute the functionalities of the system engine(s) 210. The processor(s) 214 may include microprocessors, microcomputers, microcontrollers, digital signal processors, central processing units, state machines, logic circuitries, and/or any other devices that manipulate signals and data based on computer-readable instructions.

In the present examples, the machine-readable storage medium may store instructions that, when executed by the processing resource, may implement the system engine(s) 210. In such examples, the system 102 may include the machine-readable storage medium storing the instructions and the processing resource to execute the instructions, or the machine-readable storage medium may be separate but accessible to the system 102 and the processing resource. In other examples, system engine(s) 210 may be implemented by electronic circuitry. The system engine(s) 210 may further include circuitry and hardware for monitoring operations.

The system data 212 may include data that is either stored or generated as a result of functionalities implemented by any of the system engine(s) 210. The system engine(s) 210 of the system 102 may include the query engine 104, the machine learning engine 106, a representation generation engine 216, and other system engine(s) 218. The other system engine(s) 218 may implement functionalities that supplement applications or functions performed by the system engine(s) 210. Further, the system data 212 may include query data 220, machine data 222, representation generation data 224, and other system data 226.

As previously discussed, the system 102 may use a machine learning model to provide troubleshooting solutions to the users of the electronic devices 202 to resolve an issue with the electronic device 202. In one example, the troubleshooting solution may provide a series of troubleshooting steps that allow a user to overcome an issue related to the electronic device 202. In one example, the troubleshooting solution may be directly provided to the user. In another example, the troubleshooting solution may be communicated to a human support agent which in turn may provide the troubleshooting solution to the user of the electronic device 202.

In one example, the machine learning engine 106, running the machine learning model of the system 102, may be initially trained to identify the troubleshooting solutions for different issues associated with different functional features of various device models of the electronic device. For example, the system 102 may be trained to predict troubleshooting solutions for different issues associated with different functional features of different device models of imaging devices, such as printers and scanners. In another example, the system 102 may be trained to predict troubleshooting solutions for issues associated with functional features of multiple device models of networking devices, such as routers.

In one example, the system 102 may be trained to identify and provide the troubleshooting solutions for different issues associated with different functional features irrespective of the device model of the electronic device. To train the system 102, the representation generation engine 216 may initially analyze a plurality of troubleshoot support documents currently used for providing troubleshooting solution for the electronic devices. In one example, the troubleshoot support manual may include a plurality of pages having the troubleshoot support documents for various device models. In one example, a troubleshoot support document may refer to a page, one or more pages, logs, records, and parts or sections of a page. For instance, a single page of the troubleshoot support manual may include a troubleshoot support document that may provide troubleshooting steps to overcome an issue. In another example, a troubleshoot support document may span multiple pages of the troubleshoot support manual that may provide troubleshooting steps for an issue.

In one example, a troubleshoot support document may include a series of instructions or steps to resolve an issue related to a particular functionality of an electronic device. For instance, a first troubleshoot support document for imaging devices may include troubleshooting solution for resolving a paper scan issue. Similarly, a second troubleshoot support document for imaging devices may include troubleshooting solution for resolving a color mismatch issue. Similarly, a first troubleshoot support document for networking devices may include troubleshooting solution for resolving a network connection issue. Thus, for each combination of a functional feature and an issue with the feature a separate troubleshoot support document may be created, for example, by a manufacturer of the electronic device.

Further, each troubleshoot support document may indicate the device models of the electronic device 202 for which the troubleshoot support document may be used. In one example, the troubleshoot support document for a particular issue of a particular functional feature may indicate the device models that have the particular functional feature. For instance, the first troubleshoot support document for imaging devices may indicate all device models having a functional feature of scanning. The second troubleshoot support document for imaging devices may indicate all device models having a functional feature of colored printing, colored scanning, and colored copying.

In one example, the representation generation engine 216 may analyze the plurality of troubleshoot support documents to generate a high dimension support vector for each of the plurality of device models. The high dimension support vector for a device model may indicate a relationship between the device model and each of the plurality of support pages. In one example, the relationship may indicate either presence or absence of a reference of the device model on the troubleshoot support documents. An example illustration of support vectors for a plurality of electronic devices has been provided below. For the purpose of illustration, the high dimension support vectors have been shown for only eight troubleshoot support documents, however, each high dimension support vector may include values for a multiple troubleshoot support documents.

Example High Dimension Support Vectors

|  | Trouble shoot support document 1 | Trouble shoot support document 2 | Trouble shoot support document 3 | Trouble shoot support document 4 | Trouble shoot support document 5 | Trouble shoot support document 6 | Trouble shoot support document 7 | Trouble shoot support document 8 |
| --- | --- | --- | --- | --- | --- | --- | --- | --- |
| Device 1 | 1 | 0 | 1 | 1 | 0 | 0 | 1 | 0 |
| Device 2 | 0 | 1 | 0 | 0 | 1 | 0 | 1 | 1 |
| Device 3 | 1 | 0 | 0 | 0 | 0 | 1 | 0 | 0 |

As illustrated above, the high dimension support vectors for device models device 1, device 2, and device 3 are represented having values '0' and '1'. In one example, value '1' may indicate presence of a reference of the device model for a particular troubleshoot support document while the value '0' may indicate absence of the reference of the device for that particular troubleshoot support document. In another example, value '1' may indicate presence of a reference of the device model for a particular troubleshoot support document while the value '0' may indicate absence of the reference of the device for that particular troubleshoot support document. For instance, in the above illustrated example, the device model, device 1 is understood to have been mentioned in four troubleshoot support documents—troubleshoot support documents 1, 3, 4, and 7.

Subsequently, the representation generation engine 216 may convert the high dimension support vectors to corresponding support vectors of lower dimension using a dimensionality reduction technique. Examples of the dimensionality reduction technique may include, but are not limited to, principal component analysis (PCA), kernel PCA, linear discriminant analysis (LDA), generalized discriminant analysis (GDA), and autoencoder. In one example, principal component analysis may be applied to the high dimension support vector to convert the high dimension support vector to a support vector of lower dimension. For example, high dimension support vectors for device models device 1, device 2, and device 3 may be converted to support vectors of lower dimension using principal component analysis. An example illustration of support vector of lower dimension is provided below. For the purpose of illustration, the support vector of lower dimension has been shown for only eight troubleshoot support documents, however, each low dimension support vector may include values for a multiple troubleshoot support documents.

Example Support Vectors of Low Dimension

| Device 1 | 0.1 | 0.5 | 0.4 |
| Device 2 | 0.5 | 0.2 | 0.3 |
| Device 3 | 0.7 | 0.1 | 0.2 |

As illustrated, the support vector of lower dimension may include lesser values in comparison to the high dimension support vector. Thus, using support vectors of lower dimension may help in reducing complexity and resource utilization for using the machine learning model.

Further, the representation generation engine 216 may analyze the plurality of troubleshoot support documents using natural language processing to obtain a device feature vector for each device model. The device feature vector may indicate functional features of the device models. In one example, functional features may represent behavioral objectives associated with the particular device model. For example, the functional features of an imaging device may include scanning, fax, printing, and copying. Similarly, the functional features of a network peripheral may include routing and repeating messages. An example illustration of device feature vector for device models, device 1, device 2, and device 3 is provided below. For the purpose of illustration, the device feature vector has been shown for only three device features, however, each device model may support multiple device features.

Example Device Feature Vectors

|  | Scanner | Fax | ADF (Automatic Document Feature) |
|---|---|---|---|
| Device 1 | 1 | 1 | 0 |
| Device 2 | 0 | 1 | 1 |
| Device 3 | 1 | 1 | 1 |

As illustrated above, the device feature vectors for the device models device 1, device 2, and device 3 may include values '0' and '1' to indicate absence or presence of a functional feature. In one example, value '0' may represent absence of a functional feature for the respective device model while value '1' may represent presence of a functional feature for the respective device model. In another example, value '1' may represent absence of a functional feature for the respective device model while value '0' may represent presence of a functional feature for the respective device model. For instance, in the above illustrated example, the device 3 includes the scanning and fax functionality while the ADF functionality is not present.

The representation generation engine 216 may generate a context vector for each device model based on the support vector and device feature vector corresponding to the device model. In one example, the context vector for a device model may be generated by concatenating the device feature vector and the low dimensional support vector corresponding to the device model. Thus, corresponding context vector may be generated for each of the plurality of device models to obtain a plurality of context vectors. The plurality of context vectors corresponding to the plurality of device models may be saved in the representation generation data 224 and provided to the machine learning engine 106. The machine learning engine 106 may subsequently be trained to identify and predict the troubleshooting solution for different issues of the multiple device models of the electronic device using the feature vector, the issue, and the context vectors.

Further, the machine learning engine 106 may generate a mapping table including a mapping between the plurality of context vectors and the plurality of electronic device models. In one example, the mapping table may indicate, for each device model, the context vector corresponding to device model. The mapping table may be stored in the machine learning data 222 and may be updated each time a new device is added to the system 102. In case, a new device model is launched for which troubleshooting solutions are to be provided, the representation generation engine 216 may generate a new high dimension support vector for the new device model indicating a relationship between the new device model and each of the plurality of troubleshoot support documents. Further, a new support vector of lower dimension may be generated using the dimensionality reduction techniques as previously described.

Further, the representation generation engine 216 may generate a new device feature vector indicating the functional feature of the new device model. Subsequently, a new context vector may be generated for the new device model based on the new support vector and the new device feature vector. Once the new context vector is generated, the new context vector may be provided to the machine learning engine 106 for predicting troubleshooting solution for the new device model. In one example, the machine learning engine 106 may update the mapping table to include the new context vector and the new device model.

Once the machine learning engine 106 is trained, the system 102 or a similar system may be implemented for interaction with the users of the electronic device 202. In one example, when a user of the electronic device 202 encounters an issue with the electronic device 202, the user may provide a troubleshoot query to the query engine 104. In on example, the troubleshoot query may indicate a device model of the electronic device and an issue with the electronic device. For example, a user of electronic device 202-1 may encounter an issue that the electronic device 202-N, i.e., an imaging device, "cannot print black color objects". The user may then provide the troubleshoot query indicating the device model of the imaging device 202-1 and the issue faced by the user to the query engine 104.

The query engine 104 may identify a context vector identified corresponding to the device model based on the mapping table and the device model. As previously described, the context vector describes a relationship between the device model, a plurality of troubleshoot support documents, and the functional features of the device model. Table 1 provided below illustrates an example mapping table corresponding to a plurality of device model.

TABLE 1

| | |
|---|---|
| Electronic device 202-1 | [5.88601595e−01, 4.21660016e−02, −8.55350062e−02] |
| Electronic device 202-2 | [5.88601595e−01, 4.21660016e−02, −8.55350062e−02] |
| Electronic device 202-N | [2.13702135e−02, −2.01120702e−02, 1.63796936e−01] |

As illustrated above, a first context vector corresponds to the electronic device 202-1, a second context vector corresponds to the electronic device 202-2, and a third context vector corresponds to the electronic device 202-N. Referring to the troubleshoot query, the query engine 104 may identify the first context vector in order to provide the user with the solution for query "cannot print black color".

Subsequently, the machine learning engine 106 may determine a troubleshooting solution for the issue based on the issue and the context vector corresponding to the device model. In one example, the machine learning engine 106 may identify a troubleshoot support document describing the troubleshooting solution for the issue from among the plurality of troubleshoot support documents, based on the issue and context vector to provide the troubleshooting solution. In another example, the machine learning engine 106 may analyze a plurality of case logs corresponding to the issue to identify the troubleshooting solution previously provided to a user for the same issue and the similar device model. The machine learning engine 106 may accordingly provide the troubleshooting solution to the user.

Figure 3:
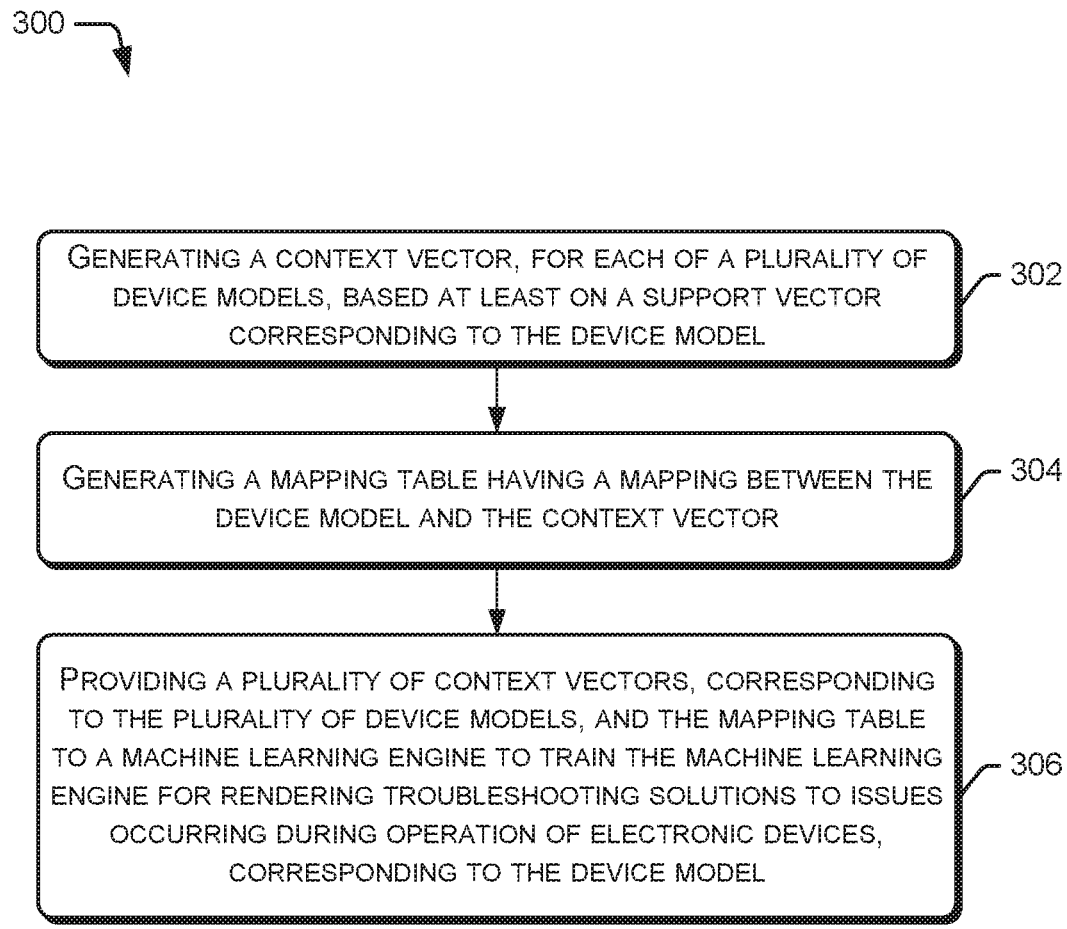
FIG. 3 illustrates a method for training a machine learning model for providing troubleshooting solutions, according to an example implementation of the present subject matter.
Figure 4:
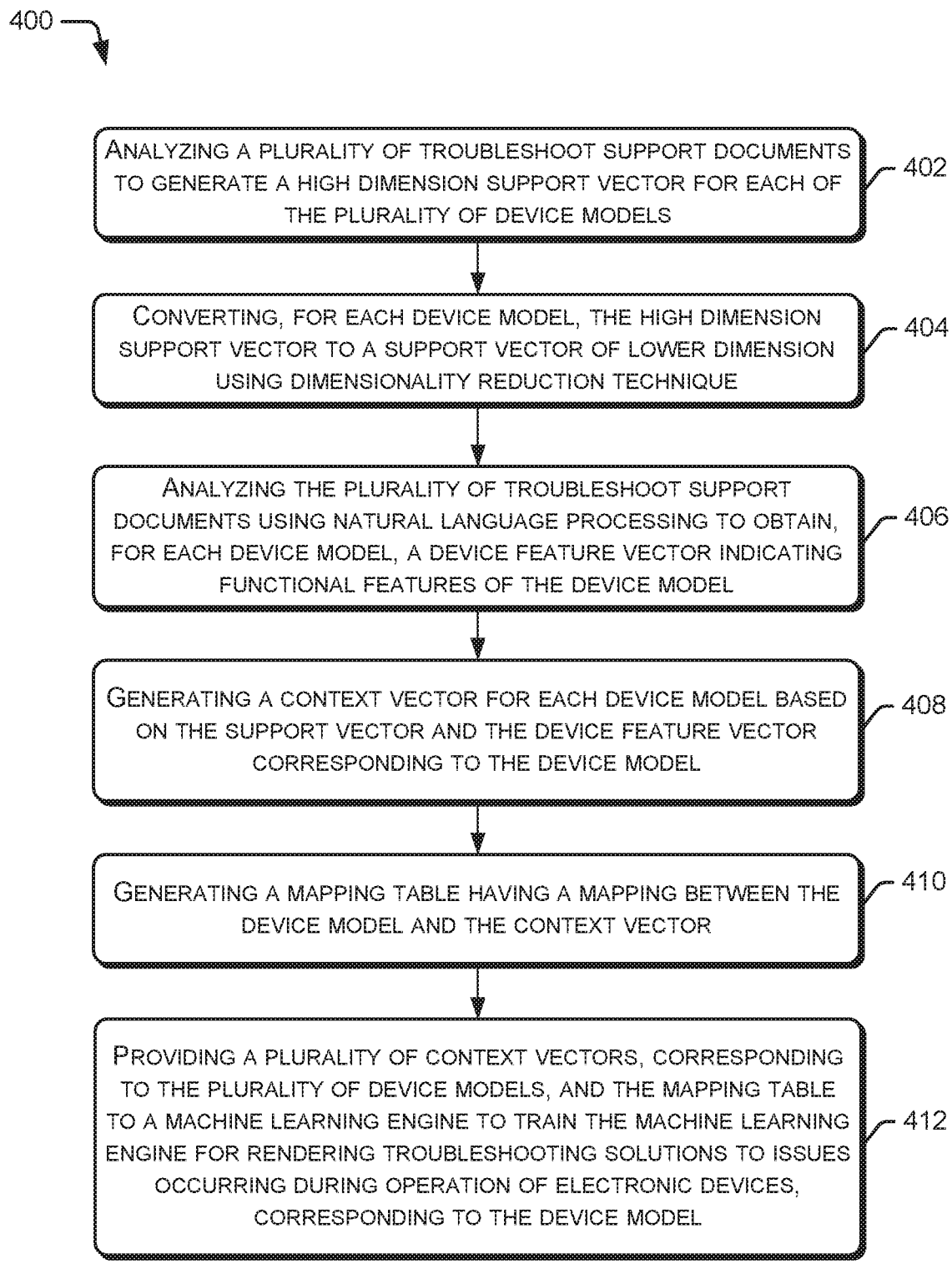
FIG. 4 illustrates a method for training the machine learning model for providing troubleshooting solutions, according to another example implementation of the present subject matter.
Figure 5:
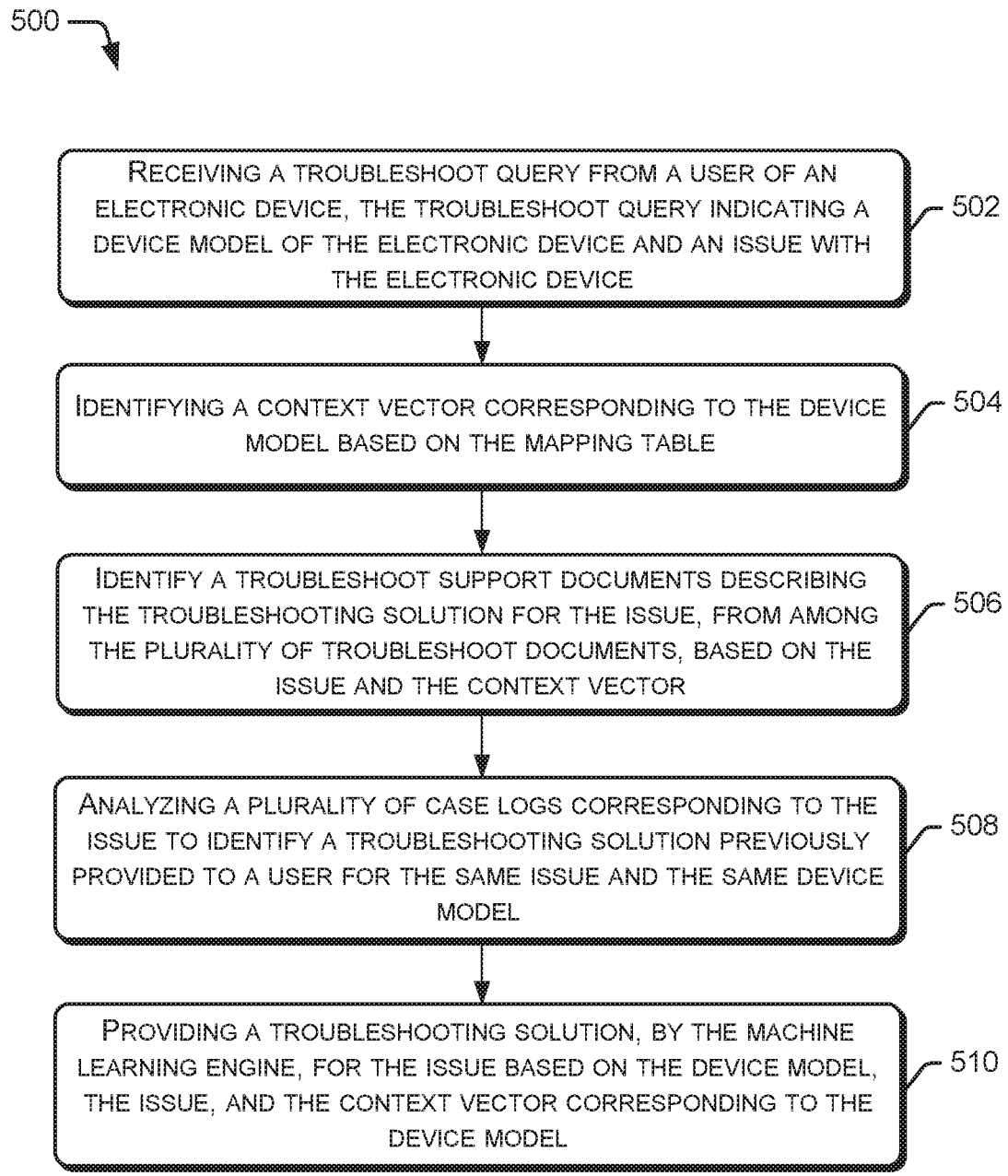
FIG. 5 illustrates a method for providing troubleshooting solutions, according to an example implementation of the present subject matter.

FIGS. 3, 4, and 5 illustrate example methods 300, 400, and 500, respectively, for providing troubleshooting solutions. The order in which the methods are described is not intended to be construed as a limitation, and any number of the described method blocks may be combined in any order to implement the methods, or an alternative method. Furthermore, methods 300, 400, and 500 may be implemented by processing resource or computing device(s) through any suitable hardware, non-transitory machine-readable instructions, or combination thereof.

It may also be understood that methods 300, 400, and 500 may be performed by programmed computing devices, such as the electronic devices 202 and the system 102, as depicted in FIGS. 1-2. Furthermore, the methods 300, 400, and 500 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. While the methods 300, 400, and 500 are described below with reference to the electronic device 202 and the system 102 as described above; other suitable systems for the execution of these methods may also be utilized. Additionally, implementation of these methods is not limited to such examples.

FIG. 3 illustrates the method 300 for training the machine learning model, according to an example implementation of the present subject matter. At block 302, a context vector may be generated for each of a plurality of device models based at least on a support vector corresponding to the device model. In one example, the context vector may describe a relationship between the device model, a plurality of troubleshoot support documents, and functional features of the device model. The troubleshoot support documents may provide plurality of options and steps to solve the issue faced by the user of the electronic device. In one example, the troubleshoot support manual may include a plurality of pages having the troubleshoot support documents for various device models. In one example, a troubleshoot support document may refer to a page, one or more pages, logs, records, and parts or sections of a page. For instance, a single page of the troubleshoot support manual may include a troubleshoot support document that may provide troubleshooting steps to overcome an issue. In another example, a troubleshoot support document may span multiple pages of the troubleshoot support manual that may provide troubleshooting steps for an issue. The functional features may represent behavioral objective associated with the particular electronic device. Examples of functional features of an imaging device may include, but are not limited to, scanning, faxing, printing, and copying. Similarly, functional features of a network peripheral may include routing and repeating messages.

At block 304, a mapping table may be generated. The mapping table may have a mapping between the device model and the context vector. In one example, the mapping table may be saved in the machine learning data 222 and updated each time a new device is added.

At block 306, a plurality of context vectors, corresponding to the plurality of device models, and the mapping table may be provided to a machine learning engine 106 to train the machine learning engine 106 for rendering troubleshooting solutions to issues occurring during operation of electronic devices, corresponding to the device models. To train the machine learning engine 106, a plurality of troubleshoot support documents currently used for providing troubleshooting solution for the electronic devices may be analyzed. In one example, a troubleshoot support document may include a series of instructions or steps to resolve an issue related to a particular functionality of an electronic device. For instance, a first troubleshoot support document for imaging devices may include troubleshooting solution for resolving a paper scan issue. Similarly, a second troubleshoot support document for imaging devices may include troubleshooting solution for resolving a color mismatch issue. Similarly, a first troubleshoot support document for networking devices may include troubleshooting solution for resolving a network connection issue. Thus, for each combination of a functional feature and an issue with the feature a separate troubleshoot support document may be created, for example, by a manufacturer of the electronic device.

FIG. 4 illustrates a method 400 for training the machine learning model, according to another example implementation of the present subject matter. At block 402, a plurality of troubleshoot support documents may be analyzed to generate a high dimension support vector for each of the plurality of device models. The high dimension support vector for the device models indicates a relationship between the device model and each of the plurality of troubleshoot support documents. In one example, the relationship may indicate either presence or absence of a reference of the device model on the troubleshoot support documents. Further, each troubleshoot support document may indicate the device models of the electronic device 202 for which the troubleshoot support document may be used. In one example, the troubleshoot support document for a particular issue of a particular functional feature may indicate the device models that have the particular functional feature.

At block 404, the high dimension support vector may be converted to a support vector of lower dimension using dimensionality reduction techniques as discussed earlier.

At block 406, the plurality of troubleshoot support documents may be analyzed using natural language processing to obtain for each device model, a device feature vector indicating functional features of the device model. The device feature vector may indicate functional features of the device models. In one example, functional features may represent behavioral objective associated with the particular device model. For example, the functional features of an imaging device may include scanning, fax, printing, and copying. Similarly, the functional features of a network peripheral may include routing and repeating messages.

At block 408, a context vector for each device model may be generated. In one example, the context vector may be generated based on the support vector and the device feature vector corresponding to the device model. In one example, the context vector for a device model may be generated by concatenating the device feature vector and the low dimensional support vector corresponding to the device model.

At block 410, a mapping table may be generated having a mapping between the device model and the context vector. In one example, the mapping table may indicate, for each device model, the context vector corresponding to the device model. The mapping table may be stored in the machine learning data 222 and may be updated each time a new device is added to the system 102.

At block 412, a plurality of context vectors corresponding to the plurality of device models, and the mapping table may be provided to a machine learning engine 106 to train the machine learning engine 106 for rendering troubleshooting solutions to issues occurring during operation of electronic devices, corresponding to the device models. Further, in case a new device model is introduced, a new high dimension support vector may be generated for the new device model indicating a relationship between the new device model and each of the plurality of troubleshoot support documents. Further, a new support vector of lower dimension may be generated using the dimensionally reduction technique as discussed earlier. Further, a new device feature vector may be generated indicating functional features of the new device model.

Based on the new support vector and the new device feature vector, a new context may be generated for the new device and may be provided to the machine learning engine 106 for predicting troubleshooting solution for the new device model.

FIG. 5 illustrates a method for providing the troubleshooting solutions, according to an example implementation of the present subject matter. At step 502, a troubleshoot query may be received from a user of the electronic device 202. The troubleshoot query may indicate a device model of the electronic device and an issue with the electronic device. In one example, the user may provide the troubleshoot query indicating the device of the electronic device 202 and the issue faced by the user. In one example, the issue may indicate a problem that the user may encounter while operating the electronic device. For example, a user may experience several problems, such as paper jam, printer connectivity issue, printing blank pages while operating an imaging device. Similarly, the user may experience several problems, such as mismatched wireless security settings, MAC address restrictions, overheating or overloading, loose or disconnected cables, and outdated firmware while operating a network peripheral.

At step 504, a context vector may be identified corresponding to the device model based on the mapping table. In one example, the context vector describes a relationship between the device model, a plurality of troubleshoot support documents, and functional features of the device model. The troubleshoot support documents may provide plurality of options and steps to solve the issue faced by the user of the electronic device. In one example, the troubleshoot support manual may include a plurality of pages having the troubleshoot support documents for various device models. In one example, a troubleshoot support document may refer to a page, one or more pages, logs, records, and parts or sections of a page. For instance, a single page of the troubleshoot support manual may include a troubleshoot support document that may provide troubleshooting steps to overcome an issue. In another example, a troubleshoot support document may span multiple pages of the troubleshoot support manual that may provide troubleshooting steps for an issue. The functional features may represent behavioral objective associated with the particular electronic device. Examples of functional features of an imaging device may include, but are not limited to, scanning, faxing, printing, and copying. Similarly, functional features of a network peripheral may include routing and repeating messages.

At block 506, a troubleshooting solution may be identified, by the machine learning engine 106, for the issue based on the device model, the issue, and the context corresponding to the device model. In one example, a troubleshoot support document describing the troubleshooting solution for the issue may be identified for the issue based on the issue and the context vector. The troubleshoot support document may be identified from among the plurality of troubleshoot support documents used to create the context vectors. In another example, a plurality of case logs corresponding to the issue may be analyzed to identify a troubleshooting solution previously provided to a user for the same issue and the similar device model. In yet another example, both the plurality of troubleshoot support document and the plurality of case logs of previous user's may be analyzed to identify a troubleshooting solution.

At block 508, a troubleshooting solution may be provided, by the machine learning engine 106, for the issue based on the device model, the issue, and the context vector corresponding to the device model.

Figure 6:
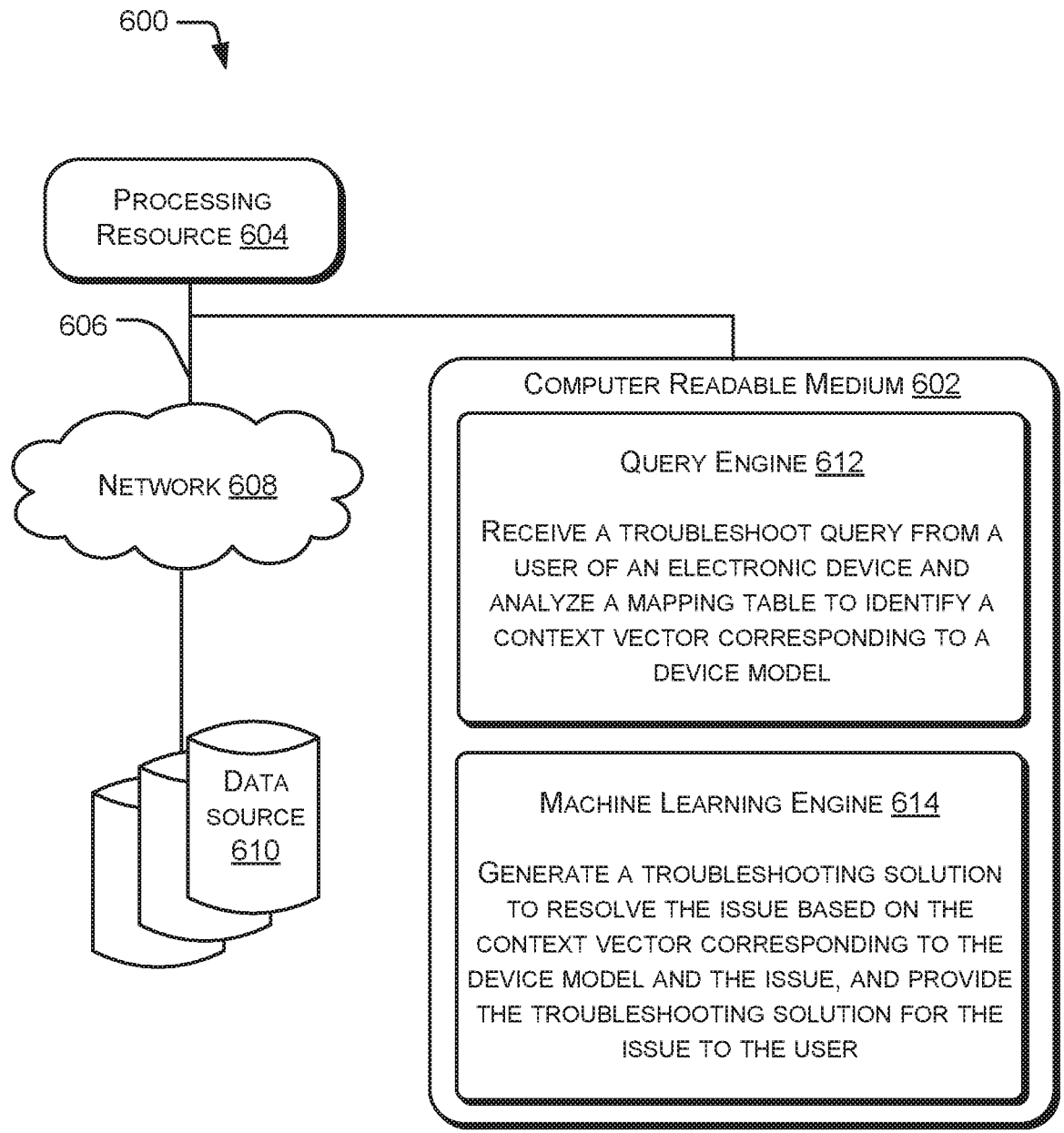
FIG. 6 illustrates a network environment having a non-transitory computer readable medium for providing troubleshooting solutions, according to an example implementation of the present subject matter.

FIG. 6 illustrates an example network environment 600 using a non-transitory computer readable medium 602 for providing troubleshooting solution, according to an example implementation of the present subject matter. The network environment 600 may be public networking environment or a private networking environment. In one example, the network environment 600 may include processing resource 604 communicatively coupled to the non-transitory computer readable medium 602 through a communication link 606.

In an example, the processing resource 604 may be a processor of an electronic device, such as the system 102. The non-transitory computer readable medium 602 may be, for example an internal memory device or an external memory device. In one example, the communication link 606 may be a direct communication link, such as one formed through a memory read/write interface. In another example, the communication link 606 may be an indirect communication link, such as one formed through a network interface. In such a case, the processing resource 604 may access the non-transitory computer readable medium 602 through a network 608. The network 608 may be a single network or a combination of multiple networks and may use a variety of communication protocols.

The processing resource 604 and the non-transitory computer readable medium 602 may also be communicatively coupled to data sources 610 over the network 608. The data sources 610 may include, for example, databases and computing devices. The data sources 610 may be used by the database administrators and other users to communicate with the processing resource 604.

In one example, the non-transitory computer readable medium 602 may include a set of computer readable instructions, such as a query engine 612, and a machine learning engine 614. As would be understood, the query engine 612 implements the functionality of the query engine 104, and the machine learning engine 614 implements the functionality of the machine learning engine 106. The set of computer readable instructions, referred to as instructions hereinafter, can be accessed by the processing resource 604 through the communication link 606 and subsequently executed to perform acts for facilitating facsimile communication.

For discussion purposes, the execution of the instructions by the processing resource 604 has been described with reference to various components introduced earlier with reference to the description of FIGS. 1-5. On execution by the processing resource 604, the query engine 612 may receive a troubleshoot from a user of an electronic device. The troubleshoot query may indicate a device model of the electronic device and an issue with the electronic device. In one example, the issue may indicate a problem that the user may encounter while operating the electronic device. For example, a user may experience several problems, such as boot failure, user error, hardware failure, software confliction and programming error while operating a computing device. Similarly, the user may experience several problems, such as flickering, loose wire connection, no sound output, and screen blackout while operating audio/video devices.

The query engine 612 may further analyze a mapping table to identify a context vector corresponding to the device model. In one example, the mapping table may include a mapping between the device model and the context vector. The context vector describes a relationship between the device model, the plurality of troubleshoot support documents, and functional features of the device model. The troubleshoot support documents may provide plurality of options and steps to solve the issue faced by the user of the electronic device. The functional features may represent behavioral objective associated with the particular electronic device. Examples of functional features of a computing device may include, but are not limited to, processing, memory, and display. Similarly, functional features of an audio/video device may include video playback, and audio playback.

Further, the machine learning engine 614 may generate a troubleshooting solution to resolve the issue based on the context vector corresponding to the device model and the issue. In one example, the machine learning engine 614 may identify a troubleshoot support document describing the troubleshooting solution for the issue from among the plurality of troubleshoot support documents, based on the issue and context vector. In another example, the machine learning engine 614 may analyze a plurality of case logs corresponding to the issue to identify the troubleshooting solution previously provided to a user for the same issue and the similar device model. The machine learning engine 614 may subsequently render the troubleshooting solution for the issue to the user.

Although examples for the present subject matter have been described in language specific to structural features and/or methods, it should be understood that the appended claims are not limited to the specific features or methods described. Rather, the specific features and methods are disclosed and explained as examples of the present subject matter.

What is claimed is:

1. A system comprising:
    a query engine to:
        receive a troubleshoot query from a user of an electronic device, the troubleshoot query indicating a device model of the electronic device and an issue with the electronic device; and
        identify a context vector corresponding to the device model based on a mapping table and the device model, wherein the context vector describes a relationship between the device model, a plurality of troubleshoot support documents, and functional features of the device model;
    a representation generation engine to:
        analyze the plurality of troubleshoot support documents using natural language processing to obtain, for each of a plurality of device models, a device feature vector indicating functional features of the device models; and
    a machine learning engine to:
        determine a troubleshooting solution for the issue based on the issue, the device feature vector, and the context vector corresponding to the device model.

2. The system as claimed in claim 1, wherein the machine learning engine is to:
    identify a troubleshoot support document describing the troubleshooting solution for the issue, from among the plurality of troubleshoot support documents, based on the issue and the context vector; and
    provide the troubleshooting solution for the issue to the user.

3. The system as claimed in claim 1, wherein the machine learning engine is to:
    analyze a plurality of case logs corresponding to the issue to identify a troubleshooting solution previously provided to a user for the same issue and a similar device model; and provide the troubleshooting solution for the issue to the user.

4. The system as claimed in claim 1, wherein the representation generation engine further is to:
analyze the plurality of troubleshoot support documents to generate a high dimension support vector for each device model, wherein the high dimension support vector for a device model indicates a relationship between the device model and each of the plurality of troubleshoot support documents; and
convert, for each device model, the high dimension support vector to the support vector of a lower dimension using a dimensionality reduction technique.

5. The system as claimed in claim 4, wherein the representation generation engine further is to:
generate a context vector for each device model based on the support vector and the device feature vector corresponding to the device model; and
provide a plurality of context vectors, corresponding to the plurality of device models, to the machine learning engine to train the machine learning engine to determine the troubleshooting solution for the issue from the plurality of troubleshoot support documents using the feature vector, the issue, and the context vectors.

6. The system as claimed in claim 5, wherein, for a new device model, the representation generation engine further is to:
generate a new high dimension support vector for the new device model indicating a relationship between the new device model and each of the plurality of troubleshoot support documents;
generate a new support vector of a lower dimension using the dimensionality reduction technique;
generate a new device feature vector indicating functional features of the new device model;
generate a new context vector for the new device model based on the new support vector and the new device feature vector; and
provide the new context vector to the machine learning engine for predicting troubleshooting solutions for the new device model.

7. The system as claimed in claim 1, wherein the context vector indicates which of the plurality of troubleshoot support documents reference the device model or a functional feature of the device model.

8. The system as claimed in claim 1, wherein respective ones of the plurality of troubleshoot support documents correspond to a troubleshoot support manual or a portion of the troubleshoot support manual.

9. The system as claimed in claim 1, wherein the machine learning engine has been trained on the plurality of troubleshoot support documents, and wherein the plurality of troubleshoot support documents does not include a troubleshoot support document specifically corresponding to the device model.

10. A method comprising:
generating a context vector, for each of a plurality of device models, based at least on a support vector corresponding to the device model, wherein the support vector for a device model indicates a relationship between the device model and each of the plurality of troubleshoot support documents, and wherein the context vector describes a relationship between the device model, a plurality of troubleshoot support documents, and functional features of the device model;
generating a mapping table having a mapping between the device model and the context vector;
providing a plurality of context vectors, corresponding to the plurality of device models, and the mapping table to a machine learning engine to train the machine learning engine for rendering troubleshooting solutions to issues occurring during operation of electronic devices, corresponding to the device models;
analyzing the plurality of troubleshoot support documents using natural language processing to obtain, for each of a plurality of device models, a device feature vector indicating functional features of the device model; and
by the machine learning engine, generating a troubleshooting solution for an issue with an electronic device based on at least the issue, the context vector corresponding to a device model of the electronic device, and the device feature vector.

11. The method as claimed in claim 10, wherein the generating the context vector comprises:
analyzing the plurality of troubleshoot support documents to generate a high dimension support vector for each device model, wherein the high dimension support vector for the device model indicates a relationship between the device model and each of the plurality of troubleshoot support documents;
converting, for each device model, the high dimension support vector to the support vector of a lower dimension using a dimensionality reduction technique; and
generating the context vector for each device model based on the support vector and the device feature vector corresponding to the device model.

12. The method as claimed in claim 10, wherein the generating the troubleshooting solution comprises:
receiving a troubleshoot query from a user of the electronic device, the troubleshoot query indicating the device model of the electronic device and the issue with the electronic device; and
providing the troubleshooting solution, by the machine learning engine, for the issue based on the device model, the issue, the device feature vector, and the context vector corresponding to the device model.

13. The method as claimed in claim 12, wherein the providing the troubleshooting solution comprises:
identifying a context vector corresponding to the device model based on the mapping table; and
performing one of:
identifying a troubleshoot support document describing the troubleshooting solution for the issue, from among the plurality of troubleshoot support documents, based on the issue and the context vector; or
analyzing a plurality of case logs corresponding to the issue to identify a troubleshooting solution previously provided to a user for the same issue and a similar device model.

14. The method as claimed in claim 10, the method comprising:
for a new device model, generating a new high dimension support vector for the new device model indicating a relationship between the new device model and each of the plurality of troubleshoot support documents;
generating a new support vector of a lower dimension using the dimensionality reduction technique;
generating a new device feature vector indicating functional features of the new device model;
generating a new context vector for the new device model based on the new support vector and the new device feature vector;

updating the mapping table to include a mapping between the new device model and the new context vector; and providing the new context vector to the machine learning engine.

15. The method as claimed in claim 10, wherein the context vector indicates which of the plurality of troubleshoot support documents reference the device model or a functional feature of the device model.

16. A non-transitory computer readable medium having a set of computer readable instructions that, when executed, cause a processor to:

receive a troubleshoot query from a user of an electronic device, the troubleshoot query indicating a device model and an issue with the electronic device;

analyze a mapping table to identify a context vector corresponding to the device model, wherein the mapping table includes a mapping between the device model and the context vector, and wherein the context vector describes a relationship between the device model, the plurality of troubleshoot support documents, and functional features of the device model;

analyze the plurality of troubleshoot support documents using natural language processing to obtain, for each of a plurality of device models, a device feature vector indicating functional features of the device models;

generate, by a machine learning engine, a troubleshooting solution to resolve the issue based on the context vector corresponding to the device model, the device feature vector, and the issue; and provide the troubleshooting solution for the issue to the user.

17. The computer readable medium as claimed in claim 16, wherein the computer readable instructions, when executed, further cause the processor to:

analyze the plurality of troubleshoot support documents to generate a high dimension support vector for each device model, wherein the high dimension support vector for a device model indicates a relationship between the device model and each of the plurality of troubleshoot support documents;

convert, for each device model, the high dimension support vector to the support vector of lower dimension using a dimensionality reduction technique; and generate the context vector for each device model based on the support vector and the device feature vector corresponding to the device model.

18. The computer readable medium as claimed in claim 16, wherein the computer readable instructions, when executed, further cause the processor to:

provide the context vectors corresponding to each of the plurality of device models, to the machine learning engine to train the machine learning engine to identify the troubleshooting solution for the issue from the plurality of troubleshoot support documents using the issue and the context vectors.

19. The computer readable medium as claimed in claim 16, wherein the computer readable instructions, when executed, further cause the processor to:

generate a new high dimension support vector for a new device model indicating a relationship between the new device model and each of the plurality of troubleshoot support documents;

generate a new support vector of lower dimension using the dimensionality reduction technique;

generate a new device feature vector indicating functional features of the new device model;

generate a new context vector for the new device model based on the new support vector and the new device feature vector;

update the mapping table to include a mapping between the new device model and the new context vector; and provide the new context vector to the machine learning engine.

20. The computer readable medium as claimed in claim 16, wherein the context vector indicates which of the plurality of troubleshoot support documents reference the device model or a functional feature of the device model.

* * * * *